United States Patent [19]

Yip et al.

[11] Patent Number: 5,751,718
[45] Date of Patent: May 12, 1998

[54] SIMULTANEOUS TRANSFER OF VOICE AND DATA INFORMATION USING MULTI-RATE VOCODER AND BYTE CONTROL PROTOCOL

[75] Inventors: William Chunhung Yip, Scottsdale; David T. Gustafson, Gilbert, both of Ariz.

[73] Assignee: Motorola, Inc., Schaumburg, Ill.

[21] Appl. No.: 603,974

[22] Filed: Feb. 20, 1996

[51] Int. Cl.⁶ ............................................. H04J 3/22
[52] U.S. Cl. .......................... 370/468; 370/477; 370/494
[58] Field of Search ............................. 370/79, 80, 81, 370/82, 83, 84, 94.2, 111, 112, 493, 494, 495, 527, 528, 529, 537, 538, 468, 470, 477

[56] References Cited

U.S. PATENT DOCUMENTS

| | | | |
|---|---|---|---|
| 4,377,860 | 3/1983 | Godbole | 370/545 |
| 4,644,529 | 2/1987 | Amstutz et al. | 370/60 |
| 4,864,566 | 9/1989 | Chauveau | 370/109 |
| 4,914,650 | 4/1990 | Sriram | 370/235 |
| 4,977,580 | 12/1990 | McNicol | 379/97 |
| 5,115,429 | 5/1992 | Hluchyj et al. | 370/231 |
| 5,463,616 | 10/1995 | Kruse et al. | 370/24 |
| 5,511,073 | 4/1996 | Padovani et al. | 370/82 |
| 5,535,204 | 7/1996 | Li | 370/76 |

Primary Examiner—Alpus H. Hsu
Assistant Examiner—Kwang Bin Yao
Attorney, Agent, or Firm—Bradley J. Botsch, Sr.

[57] ABSTRACT

A technique and method that efficiently and simultaneously transfers both voice and data information over a single communications link (11). The technique and method utilizes a multi-rate vocoder (12) for providing voice information at a plurality of different rates. Accordingly, the vocoder may be dynamically adjusted during transfer of information to meet channel bandwidth requirements. The technique and method also utilizes a byte-control protocol for inserting voice information within a stream of data information by the use of a data link escape (DLE) byte command (34). Accordingly, voice information is dynamically inserted into an existing stream of data information such that voice information is transferred only upon demand and when needed. This prevents the transfer of useless information, such as voice information when a speaker is silent and, thus, allows for very efficient utilization of system bandwidth.

8 Claims, 1 Drawing Sheet

5,751,718

1

SIMULTANEOUS TRANSFER OF VOICE AND DATA INFORMATION USING MULTI-RATE VOCODER AND BYTE CONTROL PROTOCOL

BACKGROUND OF THE INVENTION

This invention relates to simultaneous transfer of voice and data over the same communications link and, in particular, to the simultaneous transfer of voice and data over the same communications link using a multi-rate vocoder and a byte control protocol.

The telecommunications market is experiencing many changes as a result of the expansion of wireless communications and the introduction of high speed modems which have become cost effective for many commercial applications. In many applications, it is desirable to be able to transfer both voice and data information over a single communication line. Such may be the case where only one communication line exists.

One technique for simultaneously transferring both voice and data information over a single communications link is to interleave the voice and data information, bit by bit. This approach, however, is inefficient because nearly half of the time the speaker is not talking and, thus, voice information is not present and does not need to be transmitted. Additionally, such a technique requires that the transfer of voice information be synchronous with transfer of data information so that both can be interleaved properly.

Accordingly, it would be desirable to provide a method and technique for efficiently accomplishing the simultaneous transfer of both voice and data information over a single communication line.

It would also be desirable to simultaneously transfer both voice and data information over a single communications by dynamically inserting, based upon demand, voice information within data information.

BRIEF DESCRIPTION OF THE DRAWINGS

A more complete understanding of the present invention may be derived by referring to the detailed description and claims when considered in conjunction with the drawings, wherein like reference numbers refer to similar items throughout the drawings; and wherein

DESCRIPTION OF THE DRAWINGS

Figures 1, 2, 3:
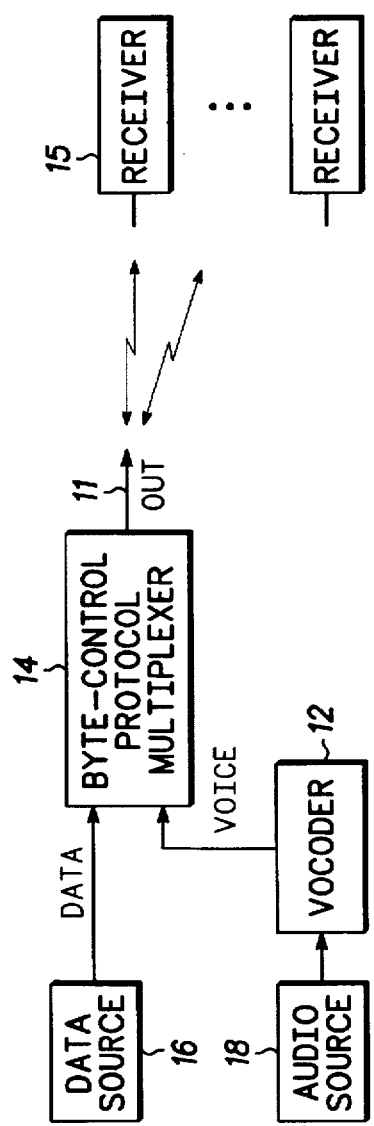
FIG. 1 is a block diagram illustrating the simultaneous transfer of both voice and data information over a single communications link using a multi-rate vocoder and a byte control protocol.
FIG. 2 is a pictorial diagram illustrating an example of an information block for inserting voice information into existing stream of data information.
FIG. 3 is a pictorial diagram illustrating a description and layout of a vocoder identification byte associated with the information block of FIG. 2.

Referring to FIG. 1, a block diagram illustrating system 10 for simultaneously transferring both data and voice information over single communications link 11 by utilizing vocoder 12 and byte control protocol multiplexer 14. System 10 also includes data source 16 for providing data information to a first input of multiplexer 14. Data source 16 may take the form of any device for providing data information such as a computer, a modem, a fax, a data network, multi-media conferencing, etc.

2

System 10 also includes audio source 18 for providing audio information to vocoder 12 the output of which provides voice information to the second input of multiplexer 14. Audio source 18 may take the form of any device for providing audio signals such as a telephone, two-way radio, cellular telephone, or any other audio source.

In a preferred embodiment, vocoder 12 may take the form of a multi-rate vocoder having the capability for providing voice information to the second input of multiplexer 14 at a plurality of different rates, for example, 9600 RELP (residual excited linear predictive coding), 4800 CELP (code excited linear predictive coding), and 2400 LPC (linear predictive coding). By utilizing a multi-rate vocoder, voice frames can be divided into strong voice frames, unvoiced frames and silent frames. For example, during strong voice frames, 9600 RELP vocoder frames will be sent, and during unvoiced frames 4800 CELP and 2400 LPC will be sent. During silence, no vocoder frame will be sent. This rate change of vocoder 12 can be dynamically adjusted during transfer to meet a channel bandwidth requirement of system 10, assuming that the channel has a larger bandwidth than the lowest vocoder rate.

The output of multiplexer 14 represents a single communications link (11) for transmitting both data and voice information to one or more receivers 15 associated with system 10 wherein receiver(s) 15 are electrically coupled to multiplexer 14, via communications link 11, for receiving the transmitted voice and data information.

Byte control protocol multiplexer 14 utilizes a byte control protocol such as a binary synchronous control (BSC) protocol, by IBM, for combining voice information from vocoder 12 with data information from data source 16. The BSC protocol is described in detail in "Technical Aspects of Data Communications", by John E. McNamara, pp. 195–205, June 1977, the subject matter of which is incorporated by reference herein.

Referring to FIG. 2, a pictorial diagram of information block 30 is shown for dynamically inserting voice information into an existing stream of data information to accomplish the simultaneous transfer of both voice and data information over a single communications link. Voice frames, such as frame 32, are inserted into an existing stream of data information at any time using the data link escape (DLE) technique as specified in, for example, the BSC protocol guidelines. The DLE technique involves transmitting a command DLE byte by system 10 to notice all receiver(s) 15 associated with system 10 that the existing stream of data information is being interrupted and that something special is coming. Accordingly, when it is desired to insert voice information into an existing stream of data information, DLE byte 34 is inserted and transmitted into the stream of data information. In this manner, voice information is dynamically inserted into an existing stream of data information such that voice information is transferred only upon demand and when needed. This prevents the transfer of useless information, such as voice information when a speaker is silent and, thus, allows for very efficient utilization of system bandwidth.

In a preferred embodiment, vocoder ID byte 36 follows DLE byte 34 for identifying the vocoder rate. Vocoder byte 36 also includes four hamming bits for error correction. Vocoder ID byte 36 is shown in detail in FIG. 3 and more fully discussed hereinafter.

Following vocoder ID byte 36, start of voice byte 38 is transmitted for indicating the start of the inserted voice information as well as indicating that the following predetermined number of bytes will be voice information, such as voice information generated by vocoder 12.

A predetermined number of voice information bytes are then transmitted as represented by byte 32.

After all of the voice bytes have been transmitted, end of voice byte 40 is transmitted for identifying the end of the transmitted voice information.

Thereafter, system 10 may resume transfer of data information, such as information from data source 16

With respect to bytes 42 and 44, if it so happens that a byte of voice information is identical to a DLE byte, then system 10 functions to transmit not one, but two bytes corresponding to the DLE bit logic combination whereby a receiver of system 10 will be programmed to remove one of the redundant bytes. In this manner, a single DLE byte in a data stream will indicate to a receiver that voice information will follow wherein the size and length of the voice frame will be determined by the vocoder ID byte as described above. However, when it so happens that a voice information byte is identical to a DLE byte, then two DLE bytes will be sent in series, as shown in FIG. 2, so that the receiver does not think that new and different voice information is to follow.

Using the above described DLE technique allows the insertion of voice information anywhere in an existing stream of data information and, thus, there is no need to keep synchronization between the transmitter and the receiver. Furthermore, such a technique allows different vocoder rates and frame sizes to be sent at any time.

Referring to FIG. 3, the bits of vocoder identification byte 36 are shown in detail. The first three bits, 46-48, are the vocoder identification field bits for identifying the rate at which vocoder 12 is transmitting voice information wherein whichever identification bit is a logic "1", then the rate associated with that bit will be the transmit rate of vocoder 12. For example, if identification bit 46 is a logic "1", then vocoder 12 will transmit voice information at 2400 bits per second (bps). If identification bit 47 is a logic "1", then vocoder 12 will transmit voice information at 4800 bps. Finally, if identification bit 48 is a logic "1", then vocoder 12 will transmit at 9600 bps. Accordingly, if the vocoder identification field bits 46-48 are "100", then a receiver of system 10 will be informed to use the 2400 bps rate vocoder to decode.

Hamming bits 50-53 are included in vocoder identification byte 36 for providing a (7,3) hamming code for providing error correction Additionally, bit 56 of vocoder identification byte 36 will be set at a predetermined logic state, for example, logic "0", for providing additional error correction and protection. Bit 56 also helps a receiver to synchronize and recognize the vocoder identification byte.

By now it should be apparent that a novel technique and method has been provided for efficiently and simultaneously transferring both voice and data information over a single communications link. The technique and method utilizes a multi-rate vocoder for providing voice information at a plurality of different rates. Accordingly, the vocoder may be dynamically adjusted during transfer of information to meet channel bandwidth requirements. The technique and method also utilizes a byte-control protocol for inserting voice information within a stream of data information by the use of a data link escape (DLE) byte command. Accordingly, voice information is dynamically inserted into an existing stream of data information such that voice information is transferred only upon demand and when needed. This prevents the transfer of useless information, such as voice information when a speaker is silent and, thus, allows for very efficient utilization of system bandwidth.

While the invention has been described in conjunction with a specific embodiments thereof, many alternatives, modifications and variations will be apparent to those of ordinary skill in the art in light of the foregoing description. Accordingly, the invention is intended to embrace all such alternatives, modifications and variations as fall within the broad scope of the appended claims.

We claim:

1. A system for simultaneously transferring both voice and data information over a single communications link, comprising:

a data source for providing data information;

a multi-rate vocoder for providing voice information at a plurality of different data rates thereby dynamically adjusting a data rate of said vocoder to meet bandwidth requirements of the system;

a multiplexer, coupled to said data source and to said vocoder, for providing both said voice information and said data information over the single communications link by inserting said voice information into a stream of said data information, said multilexer utilizing a byte-control protocol having the capability of generating a command byte for indicating that said stream of said data information is being interrupted; and a vocoder identification byte for identifying one of said plurality of different data rates of said multi-rate vocoder.

2. The system according to claim 1 wherein said voice information is inserted into said stream of data information upon demand, via said command byte, thereby allowing for efficient utilization of bandwidth of the system.

3. The system according to claim 1 further including an audio source for providing audio information to said vocoder.

4. The system of claim 1 wherein said vocoder identification byte includes at least one bit for performing error correction.

5. The system of claim 1 wherein said command byte is a data link escape byte.

6. A method for simultaneously transferring both voice information and data information over a single communications link, the method comprising the steps of:

generating a command byte to interrupt a stream of data information;

inserting voice information into said interrupted stream of said data information;

generating a start of voice information byte for indicating a start of said inserted voice information;

generating an end of voice information byte for identifying an end of said inserted voice information; and generating a byte having a logic combination identical to that of said command byte when said logic combination of said command byte appears within said inserted voice information.

7. A method for simultaneously transferring both voice information and data information over a single communications link, the method comprising the steps of:

generating a command byte to interrupt a stream of data information;

inserting voice information into said interrupted stream of said data information;

generating a start of voice information byte for indicating a start of said inserted voice information;

generating an end of voice information byte for identifying an end of said inserted voice information; and providing said voice information at a plurality of different data rates thereby allowing for dynamic adjustment of the data rate of said inserted voice information.

8. A method for simultaneously transferring both voice information and data information over a single communications link, the method comprising the steps of:

generating a command byte to interrupt a stream of data information;

inserting voice information into said interrupted stream of said data information;

generating a start of voice information byte for indicating a start of said inserted voice information;

generating an end of voice information byte for identifying an end of said inserted voice information; and generating a byte for identifying one of a plurality of diffrent data rates that said inserted voice information is provided.

* * * * *